United States Patent
Ritter et al.

(10) Patent No.: US 11,688,053 B2
(45) Date of Patent: Jun. 27, 2023

(54) SENSOR SIGNAL VISUALIZATION FOR SENSORS OF COORDINATE MEASURING MACHINES AND MICROSCOPES

(71) Applicant: Carl Zeiss Industrielle Messtechnik GmbH, Oberkochen (DE)

(72) Inventors: Markus Ritter, Heidenheim (DE); Steffen Hersacher, Westhausen (DE); Kilian Neumaier, Heidenheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 298 days.

(21) Appl. No.: 17/074,419

(22) Filed: Oct. 19, 2020

(65) Prior Publication Data
US 2021/0118124 A1 Apr. 22, 2021

(30) Foreign Application Priority Data
Oct. 18, 2019 (EP) .................................... 19204053

(51) Int. Cl.
*G06T 7/00* (2017.01)
*H04N 13/172* (2018.01)
*H04N 13/221* (2018.01)
*G06T 7/60* (2017.01)
*H04N 13/00* (2018.01)

(52) U.S. Cl.
CPC .............. *G06T 7/0004* (2013.01); *G06T 7/60* (2013.01); *H04N 13/172* (2018.05); *H04N 13/221* (2018.05); *G06T 2207/10021* (2013.01); *G06T 2207/10056* (2013.01); *G06T 2207/30164* (2013.01); *H04N 2013/0085* (2013.01)

(58) Field of Classification Search
None
See application file for complete search history.

(56) References Cited

U.S. PATENT DOCUMENTS

| | | | | |
|---|---|---|---|---|
| 2005/0203367 A1* | 9/2005 | Ahmed | ................. | A61B 90/36 600/407 |
| 2015/0253125 A1* | 9/2015 | Pettersson | ............ | G01B 21/047 345/419 |
| 2018/0228554 A1 | 8/2018 | Strommer et al. | | |

FOREIGN PATENT DOCUMENTS

| | | | |
|---|---|---|---|
| DE | 10 2010 014 423 A1 | 10/2011 | |
| EP | 0 916 923 A2 | 5/1999 | |
| JP | 6290723 B2 | 3/2018 | |

* cited by examiner

*Primary Examiner* — Xiaolan Xu
(74) *Attorney, Agent, or Firm* — Miller Johnson (57) ABSTRACT

Sensor signals from a sensor of a coordinate measuring machine or microscope describe a workpiece arranged within a space. The sensor and the space are movable relative to one another. A method of visualizing the sensor signals includes obtaining data relating to a three-dimensional scene that is stationary relative to the space. The method includes generating a two-dimensional view image of the scene. The view image has opposing edges predefined with respect to at least one of the two directions. A central region of the view image is located between the edges. The method includes, repeatedly, obtaining a two-dimensional sensor representation of the workpiece and combining the sensor representation with the view image to form a two-dimensional output image. The method includes, in response to movement between the sensor and the space, generating a new view image if the central region would extend beyond either of the edges.

20 Claims, 6 Drawing Sheets

Fig. 11

SENSOR SIGNAL VISUALIZATION FOR SENSORS OF COORDINATE MEASURING MACHINES AND MICROSCOPES

CROSS-REFERENCE TO RELATED APPLICATIONS

This application claims priority to European Application No. 19 204 053.3 filed Oct. 18, 2019. The entire disclosure of the application referenced above is incorporated by reference.

FIELD

The invention relates to industrial metrology and more particularly to systems and methods of visualizing sensor signals from optical sensors of coordinate measuring machines and microscopes.

BACKGROUND

Frequently, optical sensors for measuring a measurement object are used on coordinate measuring machines. Optical sensors are also used as components of microscopes. In both cases, a space for arranging a workpiece is provided, and measurements of the workpiece are captured by the optical sensor. When this description refers to a workpiece, this includes the case where more than one workpiece is situated in the space and also more than one workpiece is captured by the optical sensor and/or another sensor of the coordinate measuring machine or of the microscope. Optical sensors are understood to be sensors that receive electromagnetic radiation from the measurement object. With respect to the present invention, in particular imaging optical sensors are considered, wherein the image may be a one-dimensional, two-dimensional, or three-dimensional image. One-dimensional images are generated for example by sensors having a line matrix made up of sensor elements. For example, conventional digital cameras generate two-dimensional images. However, it is also possible for example that two-dimensional regions of the measurement object are scanned using point sensors or one-dimensional sensors and that two-dimensional images are generated in this way. Three-dimensional images can be generated for example by TOF (time-of-flight) cameras. Another possibility in this respect is provided by stereo camera systems or pattern projection systems. However, the invention is not restricted to the aforementioned examples of optical sensors.

Further, the invention relates to the field of coordinate measuring machines, in which at least one sensor of any type is arranged on the coordinate measuring machine for the purposes of measuring a measurement object, said sensor being movable relative to a space in which a workpiece can be arranged as a measurement object. In relation to the surroundings of the coordinate measuring machine, this means that the measurement object or the sensor or both can be moved.

SUMMARY

For the purposes of planning and monitoring the measurement operation of a coordinate measuring machine and the operation of microscopes and for the evaluation and assessment of results of the capture of objects to be measured or of captured objects, it is advantageous if either the position of the sensor or a sensor image generated from the sensor signals of the sensor is visualized in relation to a scene, wherein the scene is stationary relative to the space in which the workpiece to be captured is situated or can be arranged. The scene can be a real scene, e.g., a scene recorded by a camera, which may contain, for example, parts and/or accessories of the coordinate measuring machine or microscope and/or the workpiece, and/or the scene can be a simulated and/or animated scene, which is formed, for example, using CAD data of the workpiece and of the coordinate measuring machine or microscope and/or using measurement results from the measurement of the workpiece. By way of example, established test features can be displayed at a location in a visualized image as measurement results, wherein the location corresponds to a corresponding real location of the observed object (e.g., the measurement object).

It is particularly advantageous if a sensor image generated from the sensor signals, in particular generated repeatedly and updated by the current sensor signals, is visualized in the correct position together with an image of the scene. In particular, a user can then identify from the image representation where the region captured by the sensor is situated in the scene. The user can use this information, for example for programming a measurement procedure or for checking the implementation of a measurement procedure. During the measurement procedure or the programming, the sensor might move relative to the space for the workpiece to be captured and the progress is identifiable in the case of a repeated, respectively updated visualization. Therefore, the sensor image can image any region of the space. During a measurement operation of the coordinate measuring machine, the sensor image can image the workpiece to be measured or a part thereof.

As already described above, the image information generated by the sensor at a certain time might be one-dimensional, two-dimensional or three-dimensional, depending on the type of sensor. By way of example, it is possible by stitching the image information from a plurality of line scan cameras, by scanning the space using at least one line scan camera, by adopting or processing an image from a two-dimensional camera or by generating a projection image or sectional image from three-dimensional image information to generate the two-dimensional sensor image that is used by embodiments of the invention during the visualization.

In one variant of the invention, a representation of the sensor, instead of the sensor image generated from the sensor signals, is displayed in the correct position with an image of the scene. By way of example, in the case of tactile sensors, or else in the case of sensors measuring in contactless fashion, the visualization also renders it possible to identify how the measurement procedure should be designed or how it is carried out. Additional cameras can also be provided particularly in the case of coordinate measuring machines with such sensors, for example as known from DE 10 2010 014 423 A1.

In the case of the above-described visualization in relation to a scene of the coordinate measuring machine or microscope, it is expediently not the whole scene that is displayed in most situations but only an excerpt therefrom. Otherwise, important details of the image representation are not identifiable. Therefore, depending on the current location of the sensor or the part of the space captured by the optical sensor, an excerpt of the scene matched thereto should be used in each case for the visualization.

It is an object of the present invention to specify a method for visualizing sensor signals of an optical sensor of a coordinate measuring machine or microscope, a method for visualizing a sensor of a coordinate measuring machine, an arrangement for visualizing sensor signals of an optical sensor of a coordinate measuring machine or microscope and/or an arrangement for visualizing a sensor of a coordinate measuring machine, which, in the case of a repeated visualization and movement of the sensor relative to the space for arranging a workpiece, enable a clear and detailed image representation, wherein the outlay for adapting the displayed excerpt of the visualized scene should be low.

It is proposed to combine, in the correct position, the sensor image generated from the sensor signals of the optical sensor or—in another case—an image representation of the sensor arranged on the coordinate measuring machine with a two-dimensional view image, generated from data of the three-dimensional scene, of a portion of the three-dimensional scene to form a two-dimensional output image. Should the sensor image or, in the other case, the representation of the sensor extend beyond a predefined edge of the view image from a central region of the view image in the case of a repeated generation of the output image, then another view image is generated from the data of the three-dimensional scene, wherein said other two-dimensional view image captures a portion of the scene that has been displaced in accordance with the relative movement of the sensor and the space. Expressed differently, the portion of the scene to be displayed also moves when the sensor image or, in the other case, the representation of the sensor goes beyond the edge. The edge is specified in each case in relation to a coordinate system of the image plane of the view image.

If the view image is altered by altering the displayed portion of the scene and is adapted as a result thereof, the relative position of the edge in relation to the scene is also altered. What should be taken into account in the process is that the test as to whether the sensor image or, in the other case, the representation of the sensor extends beyond the edge is always based on an available view image, in relation to which the edge is positioned. If the view image is altered, the altered view image with the altered position of the edge in relation to the scene can be used for the subsequent test or any other later test. It should further be observed that the edge taken into account during the test may, but need not, correspond to the outer edge of the respectively present view image. Rather, it is preferable for there to be a distance between the outer edge of the view image and the edge used for the test such that an interposed zone is defined, which may be referred to as a buffer zone. Therefore, if a buffer zone is present, the view image might only be altered once the outer edge of the view image has been crossed (in this case, the edge lies outside of the outer edge), or it might already be implemented if the outer edge of the view image has not yet been reached (in this case, the edge lies within the outer edge). If the edge is located within the outer edge, the region of the output image between the outer edge of the view image and the edge for the test can be used, in particular, for displaying further content, such as for elements of an interactive graphical user interface. In general, it is preferable for the view image of the scene to always have the same size during the repeated visualization and for the edge to always have the same relative position in relation to the image region available for the view image.

In particular, the following is proposed: A method for visualizing sensor signals of an optical sensor of a coordinate measuring machine or microscope, wherein the optical sensor and a space for arranging a workpiece to be captured are movable relative to one another,
data relating to a three-dimensional scene that is stationary relative to the space are received and/or are present,
repeatedly, a two-dimensional sensor image which is generated from image signals of the optical sensor and which images a spatial region of the space at a given relative position of the optical sensor and the space is combined, in the correct position, with a two-dimensional view image of a portion of the three-dimensional scene generated from the data of the three-dimensional scene to form a two-dimensional output image and the output image is output for display purposes by an image display device,
the two-dimensional view image has two directions corresponding to its two dimensions, along which picture elements of the view image being displayable and, upon display by the image display device, actually being displayed along said directions, wherein opposing edges are predefined for the view image in respect of at least one of the two directions, a central region of the view image being located between said edges,
should the sensor image no longer image the same spatial region in comparison with a preceding generation of the output image because the optical sensor and the space for arranging the workpiece to be captured have carried out a relative movement relative to one another, a check is carried out during a repeated generation of the output image whether—in relation to a previously generated output image when using the same view image as in the previously generated output image—the sensor image of the central region would extend beyond at least one of the two opposing edges and, should this be the case, another two-dimensional view image is generated from the data of the three-dimensional scene, wherein said other two-dimensional view image captures a portion of the three-dimensional scene that has been displaced in accordance with the relative movement.

Furthermore, the following is proposed: A method for visualizing a sensor of a coordinate measuring machine, wherein the sensor and a space for arranging a workpiece to be captured are movable relative to one another,
data relating to a three-dimensional scene that is stationary relative to the space are received and/or are present,
repeatedly, a two-dimensional representation of the sensor is combined, in the correct position, with a two-dimensional view image of a portion of the three-dimensional scene generated from the data of the three-dimensional scene to form a two-dimensional output image and the output image is output for display purposes by an image display device,
the two-dimensional view image has two directions corresponding to its two dimensions, along which picture elements of the view image being displayable and, upon display by the image display device, actually being displayed along said directions, wherein opposing edges are predefined for the view image in respect of at least one of the two directions, a central region of the view image being located between said edges,
should the sensor no longer be arranged at the same position relative to the space in comparison with a preceding generation of the output image because the sensor and the space have carried out a relative movement relative to one another, a check is carried out during a repeated generation of the output image whether—in relation to a previously generated output image when using the same view image as in the previously generated output image—the representation of the sensor of the central region would extend beyond at least one of the two opposing edges and, should this be the case, another two-dimensional view image is generated from the data of the three-dimensional scene, wherein said other two-dimensional view image captures a portion of the three-dimensional scene that has been displaced in accordance with the relative movement.

The display of the output image and hence of at least part of the view image by the image display device is an optional part of the methods.

Further, the scope of the invention includes an arrangement for visualizing sensor signals of an optical sensor of a coordinate measuring machine or microscope, wherein the optical sensor and a space for arranging a workpiece to be captured are movable relative to one another, wherein the arrangement comprises an interface for receiving data of a three-dimensional scene that is stationary relative to the space and wherein the arrangement comprises:

a combining device, which is configured to repeatedly combine, in the correct position, a two-dimensional sensor image which is generated from image signals of the optical sensor and which images a spatial region of the space at a given relative position of the optical sensor and the space with a two-dimensional view image of a portion of the three-dimensional scene generated from the data of the three-dimensional scene to form a two-dimensional output image and to output the output image for display purposes by an image display device, wherein the two-dimensional view image has two directions corresponding to its two dimensions, along which picture elements of the view image being displayable and, upon display by the image display device, actually being displayed along said directions, wherein opposing edges are predefined for the view image in respect of at least one of the two directions, a central region of the view image being located between said edges, a determining device, which is configured, should the sensor image no longer image the same spatial region in comparison with a preceding generation of the output image because the optical sensor and the space for arranging the workpiece to be captured have carried out a relative movement relative to one another, to check during a repeated generation of the output image whether—in relation to a previously generated output image when using the same view image as in the previously generated output image—the sensor image of the central region would extend beyond at least one of the two opposing edges and, should this be the case, to generate another two-dimensional view image from the data of the three-dimensional scene and output said other two-dimensional view image to the combining device, wherein said other two-dimensional view image captures a portion of the three-dimensional scene that has been displaced in accordance with the relative movement.

Additionally, the scope of the invention includes an arrangement for visualizing a sensor of a coordinate measuring machine, wherein the sensor and a space for arranging a workpiece to be captured are movable relative to one another, wherein the arrangement comprises an interface for receiving data of a three-dimensional scene that is stationary relative to the space and wherein the arrangement comprises:

a combining device, which is configured to repeatedly combine, in the correct position, a two-dimensional representation of the sensor with a two-dimensional view image of a portion of the three-dimensional scene generated from the data of the three-dimensional scene to form a two-dimensional output image and to output the output image for display purposes by an image display device, wherein the two-dimensional view image has two directions corresponding to its two dimensions, along which picture elements of the view image being displayable and, upon display by the image display device, actually being displayed along said directions, wherein opposing edges are predefined for the view image in respect of at least one of the two directions, a central region of the view image being located between said edges, a determining device, which is configured, should the sensor no longer be arranged at the same position relative to the space in comparison with a preceding generation of the output image because the sensor and the space have carried out a relative movement relative to one another, to check during a repeated generation of the output image whether—in relation to a previously generated output image when using the same view image as in the previously generated output image—the representation of the sensor of the central region would extend beyond at least one of the two opposing edges and, should this be the case, to generate another two-dimensional view image from the data of the three-dimensional scene and output said other two-dimensional view image to the combining device, wherein said other two-dimensional view image captures a portion of the three-dimensional scene that has been displaced in accordance with the relative movement.

Hence, in particular, a first two-dimensional sensor image which is generated from image signals of the optical sensor and which images a first spatial region of the space in a first relative position of the optical sensor and the space can be combined with a first two-dimensional view image of a first portion of the three-dimensional scene generated from the data of the three-dimensional scene to form a first two-dimensional output image and the first output image can be output for display purposes by an image display device. At a later time and, in particular, immediately following the generation of the first output image, a second two-dimensional sensor image which is generated from image signals of the optical sensor and which images a second spatial region of the space in a second relative position of the optical sensor and the space can be combined with a second two-dimensional view image of a second portion of three-dimensional scene generated from the data of the three-dimensional scene to form a second two-dimensional output image and the second output image can be output for display purposes by the image display device. Here, a relative movement has occurred from the first relative position to the second relative position. Should the second sensor image extend beyond at least one of the two opposing edges of the first view image from the central region, then the second portion of the three-dimensional scene is displaced in relation to the first portion of the three-dimensional scene in accordance with the relative movement. A corresponding statement applies in the case where, instead of the two-dimensional sensor image, a two-dimensional representation of the sensor is respectively combined, in the correct position, with the view image to form an output image.

Since the other view image (e.g., the second view image) captures a portion of the three-dimensional scene that has been displaced in accordance with the relative movement of the sensor and the space, it is possible to display a suitable excerpt of the scene, wherein the image representation, firstly, is clear and, secondly, need not represent an excerpt of the scene that is too large and is therefore able to display details in a sufficient size. Further, the outlay for the user observing the display is low in respect of the adapting visualization. In particular, the other view image can be generated automatically when the method is carried out. Therefore, the user can only carry out or control the relative movement, for example, or the relative movement can be controlled automatically. In both cases the user themselves need not ensure an updated visualization.

The three-dimensional scene can be represented by a three-dimensional data record; i.e., the data of the scene are related to a three-dimensional coordinate system such as, e.g., a Cartesian coordinate system. Then, in one configuration, the view image of the portion of the three-dimensional scene to be used for the output image can be respectively generated from the three-dimensional data record, for example by projecting the portion onto the image plane of the two-dimensional view image. Alternatively, a plurality of view images of the three-dimensional scene could have been generated in advance and, if there is a change in the portion of the three-dimensional scene to be used for the output image, an available view image corresponding to the respective portion is selected. In particular, a respective view image may be produced in advance for a plurality of portions of the three-dimensional scene such that, however, a view image is not present for each possible portion of the scene. Further, the viewing direction on the scene is preferably always the same. By way of example, the viewing direction may always coincide with the z-direction of a three-dimensional Cartesian xyz coordinate system of the coordinate measuring machine or microscope, or else with the direction of another coordinate axis of the coordinate system. As a result, the number of possible view images is significantly reduced. However, even in the case of an unchanging viewing direction, a view image need not have been generated in advance for each possible portion of the scene. By way of example, the outer limits of the view images and hence of the displayed portions may correspond to a regular grid in the view plane of the scene, with the grid spacing being greater than the size of a picture element of the view image. In this case, not every relative movement of the sensor and of the space can be visualized by an equally sized offset of the displayed portion of the scene. By way of example, as a result, the position of the sensor image or of the representation of the sensor may change discontinuously in the output image.

However, whenever an altered view image which represents the correspondingly offset portion of the scene is used, it is preferable in each case to generate the view image from a three-dimensional data record of the scene, to be precise preferably in such a way that the position of the sensor image or of the representation of the sensor in the output image is not altered discontinuously by more than one pixel.

In particular, the three-dimensional data record can contain not only the three-dimensional data of the scene but also sensor data generated from the sensor signals or, in the other case, data for representing the sensor. In so doing, it is preferable for the three-dimensional data record to be changed in accordance with the current relative position of the sensor and space and for said data record to contain the current generated sensor data or, in the other case, the data for representing the sensor as per the current position of the sensor. Even in the first case of the sensor data generated from the sensor signals, these should be stored at the position in the three-dimensional data record which corresponds to the part of the space captured by the sensor in the case of the current position of the sensor relative to the space. By way of example, the position can be the position of the sensor or it could be, for example, a central position of the representation of the sensor in the focal plane or in a plane at a given distance from the sensor or a central position of the part of the space captured by the sensor. Therefore, it is preferable for a three-dimensional data record related to a three-dimensional coordinate system of the space to be used when generating the output image, said three-dimensional data record having the three-dimensional data of the scene and sensor data generated from the sensor signals in the first case or data relating to the representation of the sensor in the other case in accordance with the current position of the sensor.

Therefore, the view image can be generated directly from the three-dimensional data record. It should be emphasized here that, in specific configurations, two-dimensional data, specifically, e.g., the current sensor image or the representation of the sensor at the position corresponding to the current position of the sensor, at a position in the focal plane or at a position in a plane at a given distance from the sensor, can be stored as parts of the three-dimensional data record. By way of example, the sensor image or the representation of the sensor can always be located in the foreground in relation to the viewing direction of the view image to be created, i.e., no part of the scene covers the sensor image. In the case of the representation of the sensor, this can likewise be located in the foreground, wherein, however, it is also possible for parts of the scene to be identifiable through the representation of the sensor, i.e., the same pixels of the output image can represent both parts of the sensor image and parts of the scene. By way of example, the sensor image or the representation of the sensor is always located in the foreground if, in the viewing direction of the view image, only regions of the scene behind the image plane of the sensor image or behind the representation of the sensor are used for the output image.

Independently of whether a common three-dimensional data record is used for data of the scene and for the sensor image or the representation of the sensor, the sensor image can be identifiable in front of the background of the view image of the scene in the output image. By way of example, this can be achieved by virtue of the sensor image being completely identifiable in the display of the output image and by virtue of pixels of the sensor image replacing pixels of the view image at the respective position of the output image. However, it is also possible for elements of the scene to also be identifiable in the output image at positions of the sensor image. By way of example, contours of the scene may shine through. By way of example, this can be achieved by pixels at positions of the sensor image that correspond to the contours being darker or having a specified color in the output image.

As mentioned, the combination of the two-dimensional sensor image with the two-dimensional view image can be achieved in different ways, specifically, for example, by inserting the sensor data or the corresponding sensor image into the three-dimensional data record and subsequently generating the output image from the data record. Alternatively, for example, the view image can be generated from the three-dimensional data record without the information items about the sensor or without the information items about the representation of the sensor and this view image can be combined, in the correct position, with the two-dimensional sensor image or the two-dimensional representation of the sensor. In any case, a combination in the correct position requires taking account of the fact that the three-dimensional scene and the space for arranging the workpiece to be captured are stationary relative to one another, in any case during a given operating phase. Naturally, the scene can be altered or displaced in another operating phase of a coordinate measuring machine or microscope, for example if a sensor cartridge is placed at another position of the coordinate measuring machine or microscope.

The combination of the two-dimensional sensor image with the two-dimensional view image of the scene requires that the combination is in the correct position in the image plane of the two-dimensional output image in accordance with the relative position of sensor and space in relation to the image plane. In general, therefore, the sensor image or the representation of the sensor in different image sizes can be in the correct position in relation to the two-dimensional view image in each case. However, the combination is preferably also in the correct position in respect of the ratio of the image sizes of the sensor image and the view image, i.e., in accordance with the relative position of sensor and space in the direction perpendicular to the image plane.

In particular, the output image can have a constant size; i.e., the size does not change in the case of a repeated generation and output of the output image. The view image, too, can have a constant size. However, a constant size does not necessarily mean that the image represents spatial regions of the same size. Even if this is the case in many operating phases, the three-dimensional scene, for example, can be represented in reduced or magnified fashion in comparison with a preceding generation of the output image, as yet to be described below. A constant size of the output image or view image can be achieved by virtue of, in particular, use being made of the same number and arrangement of pixels.

The coordinate measuring machine or microscope has a space for arranging a workpiece to be captured. In some types of coordinate measuring machines or microscopes, this space is movable relative to the surroundings of the coordinate measuring machine or microscope. By way of example, this is the case in a coordinate measuring machine with a translation stage movable in two directions perpendicular to one another, on which a measurement object can be arranged for measurement purposes. Therefore, movability can be realized in relation to the surroundings of the coordinate measuring machine or microscope by way of a movement of the sensor and/or by way of a movability of the space. In any case, the sensor and the space for arranging the workpiece to be captured are movable relative to one another. If a workpiece is arranged in the space, then the sensor and the workpiece (e.g., a measurement object) arranged in the space are therefore also movable relative to one another. It is preferable for the coordinate system of the three-dimensional scene to be at rest in the space for arranging the workpiece to be captured, i.e., to be a coordinate system of said space. Therefore, in this case, visualized relative movements of the sensor and of the space and consequently of the three-dimensional scene can be represented in the same way in the different types of coordinate measuring machines or microscopes.

As described, another two-dimensional view image of the scene, which captures a portion of the three-dimensional scene that has been displaced in accordance with the relative movement of sensor and space is generated if the sensor image or the representation of the sensor in the output image would extend beyond at least one of the two opposing edges from the central region of the view image. Specific situations and configurations will be discussed in more detail below. There could also be situations in which, as an exception, no different view image than previously is used for the output image. This will also be discussed in more detail. However, if another view image of the scene is generated, then this captures a portion of the three-dimensional scene that has been displaced in accordance with the relative movement. In this context, "in accordance with" means that, in particular, in respect of a two-dimensional Cartesian coordinate system in the image plane of the view image, which also is the image plane of the output image, a movement component of the displacement and a movement component of the movement of the sensor relative to the space have the same direction. In particular, the movement components are related to a coordinate axis of the coordinate system that extends perpendicular to the edge beyond which the sensor image or the representation of the sensor would extend. In a specific configuration, the direction of the displacement can correspond to the direction of the movement of the sensor relative to the space. However, this is generally not the case. However, the displacement in respect of the direction extending perpendicular to the edge is not opposite to the movement of the sensor relative to the space since the sensor image or the representation of the sensor would in that case extend even further beyond the edge from the central region.

All the images that are used to generate the output image, and the output image itself, are in particular digital images that have been combined in particular from a two-dimensional arrangement of picture elements (pixels). It is known that each picture element is positioned at a position in a regular two-dimensional coordinate system of the image and is displayed, upon display by an image display device, at a corresponding position of the display medium (for example screen or projection surface). The term image is also used when a corresponding data record is present. An image therefore does not generally require that it is, in fact, displayed. On the other hand, however, a corresponding data record is always displayable, for example on a screen.

It may be intended that the three-dimensional scene be represented in magnified or reduced fashion in comparison with a preceding generation of the output image, in accordance with the zoom function known from camera technology. In this case, the same view image cannot be used for the output image to be generated, already on account of the magnification. In this case, it is preferable for the opposing edges to be redefined in relation to the view image to be used and for a check then to be carried out as to whether the sensor image or the representation of the sensor would extend beyond at least one of the two opposing edges from the central region between the opposing edges. Should this be the case, it is possible to generate another two-dimensional view image, optionally depending on whether at least one further criterion is satisfied, and to use said other two-dimensional view image for the output image. This other two-dimensional view image then shows a displaced portion of the three-dimensional scene; however, this portion has not been magnified or reduced in size again. By generating the other two-dimensional view image, it is possible in this case to take account of a relative movement of the sensor and of the space for arranging the workpiece to be captured and/or to obtain a position of the sensor image or the representation of the sensor that is better suited for the visualization (e.g., a more central position in the output image).

The edge can be defined according to a specified prescription in relation to the view image, in particular following a zoom procedure but also in other cases or in general. By way of example, it is possible to specify the distance from the outer edge of the view image at which the edge extends. This distance can also be zero, i.e., the edge can coincide with the outer edge. Optionally, the distance can be specified individually for each edge (e.g., upper edge, lower edge, right edge, and left edge). However, the same distance is preferably specified, at least for the respective opposing edges and preferably for all edges. By way of example, the distance can be specified in the form of the number of pixels of the view image or, if the pixel size of the view image deviates from that of the output image, in the form of the number of pixels of the output image.

According to one configuration of the method and the arrangement, in respect of the two directions corresponding to the two dimensions of the two-dimensional view image, opposing edges are predefined in each case, with the central region of the view image being located therebetween, wherein four edges are consequently predefined, which have a closed, peripheral edge profile.

In particular, the opposing edges, which are predefined in respect of at least one of the two directions of the two-dimensional view image, can each extend in a straight line parallel to one another. Therefore, in particular, a total of four edges can extend around a central region of the view image in the form of a parallelogram or in the form of a rectangle. Further, it is preferable for the edges to each extend parallel to an outer edge of the view image, with "parallel" also including the case where an edge or all edges coincide with the outer edges of the view image.

However, the invention is not restricted to edges extending parallel to the outer edges of the view image or to edges extending in a straight line. Rather, the edges can be sections of an overall peripheral edge profile. Here, the edge profile can be elliptical or circular or else have an irregular extent, for example. It is also possible that no overall peripheral edge profile is formed by the edges. By way of example, if a check as to whether the sensor image would extend beyond at least one of the two opposing edges from the central region is merely carried out in one of the two directions of the two-dimensional view image, then only two opposing edges might be predefined in any form and used for the test. It is also possible that, although a test is carried out for both directions of the two-dimensional view image and the total of four edges respectively oppose one another in pairwise fashion, said four edges do not have a continuous peripheral edge profile.

The test as to whether the sensor image or the representation of the sensor would extend beyond at least one of the two opposing edges from the central region can be implemented, in particular, in respect of both directions of the two-dimensional view image; i.e., opposing edges may exist for the view image in respect of each of the two directions. Further, there may optionally be a displacement of the portion of the three-dimensional scene captured by the view image for each of the two directions.

In particular, should it be established in one configuration of the method or the arrangement that
(in the case of the representation of the sensor image) the sensor image or
(in the case of the representation of the sensor) the representation of the sensor
would extend beyond merely one of the two opposing edges from the central region of the view image, the portion of the three-dimensional scene can be displaced so far that
(in the case of the representation of the sensor image) the sensor image or
(in the case of the representation of the sensor) the representation of the sensor
is located between the two opposing edges in the view image. In the case of the arrangement, the determining device is configured accordingly. This configuration of the method and the arrangement relates, in particular, to the situation in which the sensor image or the representation of the sensor is situated completely between the opposing edges in the previously generated output image; i.e., it is not greater than the distance between the edges.

In particular, should it be established in one configuration of the method or the arrangement that
(in the case of the representation of the sensor image) the sensor image or
(in the case of the representation of the sensor) the representation of the sensor
would extend beyond both of the two opposing edges from the central region, the portion of the three-dimensional scene can be displaced so far that
(in the case of the representation of the sensor image) the sensor image or
(in the case of the representation of the sensor) the representation of the sensor
in the output image, which has an image plane in accordance with the two directions,
a) appears displaced by a distance relative to the three-dimensional scene, which equals the path traveled by the relative movement multiplied by a specified factor, and/or
b) appears displaced relative to the three-dimensional scene in a displacement direction, which equals the movement direction of the relative movement projected onto the image plane of the output image.

In the case of the arrangement, the determining device is configured accordingly. This configuration of the method and the arrangement corresponds, in particular, to the situation in which the sensor image or the representation of the sensor extends beyond both opposing edges from the central region, even in the previously generated output image. In particular, the specified factor which is multiplied by the path traveled by the relative movement can equal one. In this case, the representation of the sensor or the sensor image remains at the same position with respect to the output image.

The following advantage relates to the two configurations described immediately above: Particularly if the sensor moves continuously relative to the space or repeatedly relative to the space multiple times, it is possible, in the case where it is repeatedly established that the sensor image would extend beyond one of the opposing edges and in the case of a corresponding generation of a displaced view image of the scene, to ensure that a suitable view image is displayable together with the sensor image or the representation of the sensor by the display of the output image. Consequently, the portion of the scene displayed upon display of the output image is updated.

In particular, in the case of one configuration of the method or the arrangement,
(in the case of the representation of the sensor image) the sensor image or
(in the case of the representation of the sensor) the representation of the sensor
might initially not be situated between opposing edges of the view image in respect of at least one of the two directions of the view image, the sensor might then be moved relative to the space in such a way that, in the case of the repeated generation of the output image, (in the case of the representation of the sensor image) a center of the sensor image or (in the case of the representation of the sensor) a center of the representation of the sensor and a center of the view image approach one another, wherein, during the repeated generation of the output image, another two-dimensional view image capturing a portion of the three-dimensional scene that has been displaced in accordance with the relative movement is only generated from the data of the three-dimensional scene if (in the case of the representation of the sensor image) the sensor image or (in the case of the representation of the sensor) the representation of the sensor is located, at least once, completely between the two opposing edges or extends, at least once, beyond both opposing edges from the central region. In the case of the arrangement, the determining device is configured accordingly.

The initial situation of this configuration, specifically that the sensor image or the representation of the sensor is initially situated outside of the region between the opposing edges, can therefore lead to the two aforementioned situations, for which configurations of the invention have likewise been described. Pausing the update of the portion of the scene represented by the view image allows the sensor image or the representation of the sensor to initially coincide with a portion of the scene suitable for the common representation and the representation of the scene to only subsequently be updated.

In particular, the visualization method can be carried out as part of a method for controlling an operation of the coordinate measuring machine or microscope, wherein the output image displayed on the image display device is used within the scope of controlling the operation of the coordinate measuring machine or microscope. A user can use the repeated display of the output image with optional updating of the representation of the scene in accordance with the movement of the sensor relative to the space, in particular for the creation (in particular programming) and/or the checking of a measurement procedure of the coordinate measuring machine or of an operation of the microscope. Therefore, the repeated display can occur during the creation of a measurement procedure and/or during an execution of a measurement procedure. In particular, the user moves the sensor into another position during the creation of a measurement procedure and obtains another output image with an updated representation of the scene thereby. By way of example, this makes it easier for the user to select a measurement object displayed in the output image.

The test as to whether the sensor image or the representation of the sensor extends beyond at least one edge from the central region of the view image and the establishment of whether the sensor image or the representation of the sensor is even situated between the two opposing edges can be carried out as soon as the relative position of the sensor image or of the representation of the sensor and the relative position of the edge or the edges are known in relation to a common coordinate system. By way of example, the test and/or establishment can therefore be implemented on the basis of the aforementioned three-dimensional data record. As an alternative or in addition thereto, the test and/or establishment can be carried out in relation to a two-dimensional coordinate system of the view image.

In particular, the position and optionally also the alignment of the sensor in relation to the space can therefore be determined in advance, for example by calibration. To this end, at least one calibration object, which is captured by the sensor, can be arranged in the space. Further, on the basis of the captured data generated by the sensor and on the basis of the measurement data of a position measuring system of the coordinate measuring machine or microscope, which reproduce the position and optionally the alignment of the sensor in relation to the coordinate measuring machine or microscope, it is possible to establish the relation to the position and optionally the alignment of the sensor in relation to the space. Additionally, the position and alignment of the scene or of part of the scene relative to the space can be ascertained by calibration. By way of example, this can relate to a sensor cartridge or other attachment and add-on parts, which are not fixed constituent parts of the coordinate measuring machine or microscope but are parts of the scene. By way of example, these are captured in corresponding fashion by the sensor, like the aforementioned calibration object. To the extent that the scene has virtual data and/or planning data (e.g., CAD data), for example of a workpiece to be captured, a calibration can be carried out in the same way. By way of example, a measurement object which corresponds to the planning data is captured by the sensor and the planning data are registered in the space on the basis of characteristic features of the measurement object such that the planning data are then available in relation to a coordinate system of the space. As an alternative or in addition to the sensor whose sensor signals or whose representation should be visualized, a camera or camera system can be used for registration purposes if this camera or the camera system has a large capture range, which corresponds to the entire scene or at least to a majority of the scene. Objects and/or features of objects captured by the camera or the camera system can be identified in the scene and the registration can be obtained in this manner. As an alternative or in addition thereto, a user can register at least parts of the scene in the coordinate system of the space by way of a manual control.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Example embodiments of the invention will now be described with reference to the accompanying drawing. In the individual figures of the drawing.

DETAILED DESCRIPTION

Figure 1:
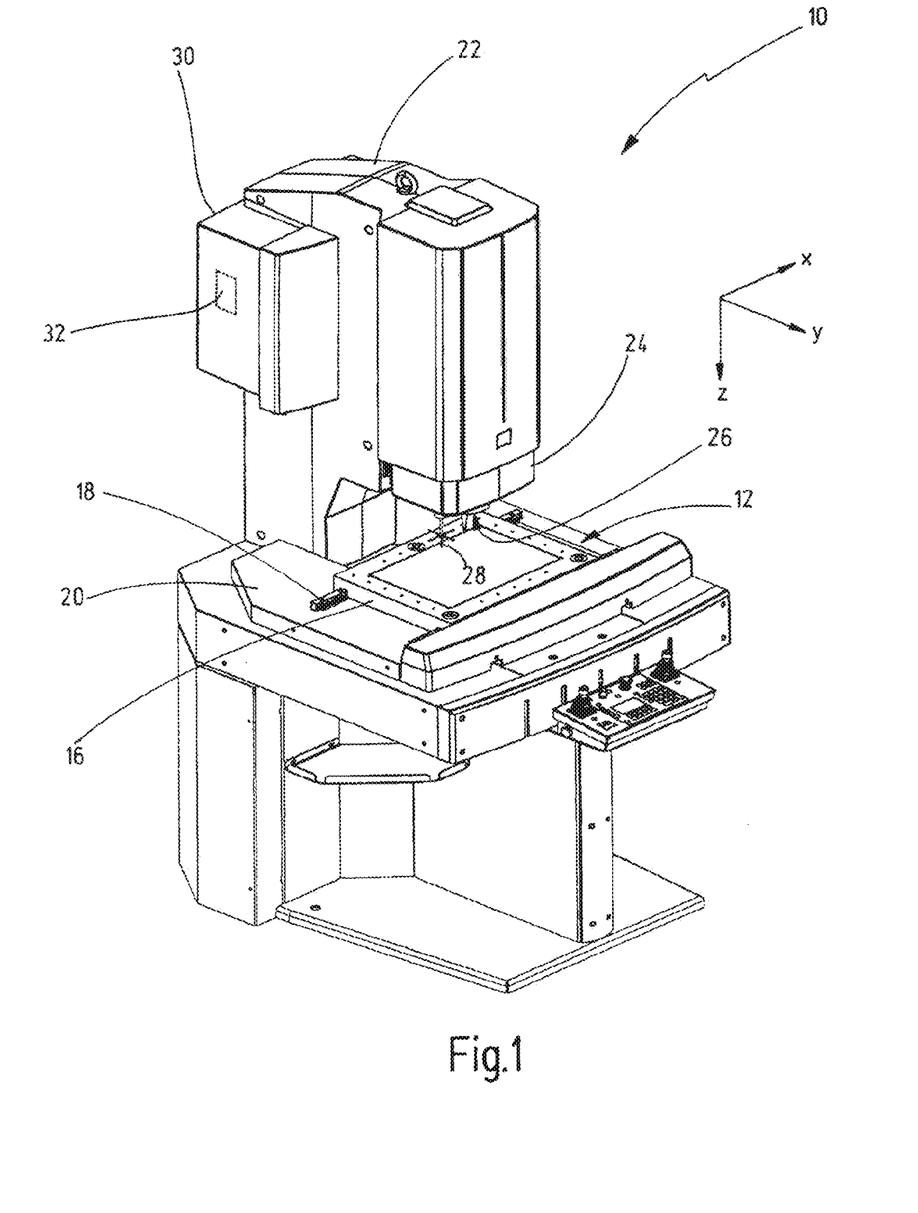
FIG. 1 shows a coordinate measuring machine having a movable workpiece receptacle and a movable sensor.

FIG. 1 shows an example coordinate measuring machine 10 with a workpiece receptacle 12, realized here in the form of a translation stage, which is displaceable in the horizontal directions x and y of the Cartesian xyz coordinate system of the coordinate measuring machine 10. Such translation stages are also referred to as xy-stages. The workpiece receptacle 12 serves for positioning a measurement object (not illustrated in FIG. 1), which can be measured by the coordinate measuring machine 10.

The workpiece receptacle 12 in this case has an upper part 16, which is movable along two guide rails 18 in a first direction, the x-direction. The guide rails 18 are arranged on a lower part 20 of the workpiece receptacle 12, which lower part is movable along further guide rails (not identifiable in FIG. 1) in a second spatial direction, the y-direction.

The reference numeral 22 denotes a column, along which a slider 24 is movable in a third spatial direction, the z-direction. The slider 24 carries an optical sensor 26 and can optionally also carry a tactile sensor 28.

The present invention, however, is not restricted to such coordinate measuring machines and can equally be used in a coordinate measuring machine that has a different holding structure for the optical sensor with different movement directions for moving the sensor than shown in FIG. 1. For example, the coordinate measuring machine can have, instead of the holding structure with the translation stage and the column 22, a holding structure of bridge design, portal design, horizontal-arm design or other designs including hexapods.

The reference numeral 30 in FIG. 1 denotes an evaluation and control unit, which is arranged in the example embodiment on the fixed column 22. The evaluation and control unit 30 serves firstly for moving the respectively used sensor 26, 28 into a desired measurement position relative to a measurement object on the workpiece receptacle 12.

In addition, the evaluation and control unit 30 is able to determine coordinates of selected measurement points on the measurement object and subsequently geometric properties of the measurement object. A processor 32 of the evaluation and control unit 30, by which signals of the optical sensor 26 can be visualized together with a certain image excerpt of the 3D scene by way of controlling a screen, which is not illustrated in FIG. 1, is illustrated schematically.

The evaluation and control unit 30 can also be realized differently than illustrated. For example, it can be divided over at least two separate components, wherein in particular the evaluation unit can be realized as a computer separate from the coordinate measuring machine. Alternatively or in addition thereto, it is possible to use, instead of a screen, a different image display device, such as an image projector.

In all cases, including those that have not been mentioned, the image excerpt determining device, which determines the image excerpt of the 3D scene which should be displayed together with the image generated by the optical sensor, can be part of the evaluation and control unit and/or can be realized by a device that is separate from the coordinate measuring machine, for example a computer. The combining device, too, which combines the image generated by the optical sensor with the image excerpt of the 3D scene to be displayed together, can be part of the evaluation and control unit and/or can be realized by a device that is separate from the coordinate measuring machine, for example a computer, in particular by the same computer that also has the determining device. By way of example, a processor of the evaluation and control unit, in particular the aforementioned processor 32, or a processor of the separate computer can provide and perform, controlled by software, the function of the determining device and/or the combining device.

The movability of a microscope can be realized in the same way as in the coordinate measuring machine illustrated in FIG. 1; i.e., the workpiece or observation object can be supported by a receptacle that is movable in one direction or in two independent directions, and the optical sensor can be movable in a direction that is independent, in particular linearly independent, of the movement direction or the movement directions of the receptacle.

The schematic illustrations in FIG. 2 to FIG. 10 are used to describe situations when displaying a sensor image and a view image of a three-dimensional scene. In all situations, a two-dimensional representation of a sensor of a coordinate measuring machine can be used instead of the sensor image. Further alternatively, the sensor image can be an image of a sensor of a microscope.

In particular, the sensor image or the representation of the sensor is rectangular, as shown schematically in FIG. 2 to FIG. 10. However, the invention is not restricted to a rectangular two-dimensional representation. By way of example, the representation of a sensor could have a different outer edge to a rectangular outer edge. Should the outer edge be curved, it is convex when representing the sensor or the sensor image such that an outermost point of the outer edge is uniquely defined in both of the two linearly dependent directions of the image plane and in the opposite directions. Then, this outermost point can be used for the test as to whether it is located outside of one of the edges additionally defined for the view image.

Figure 2:
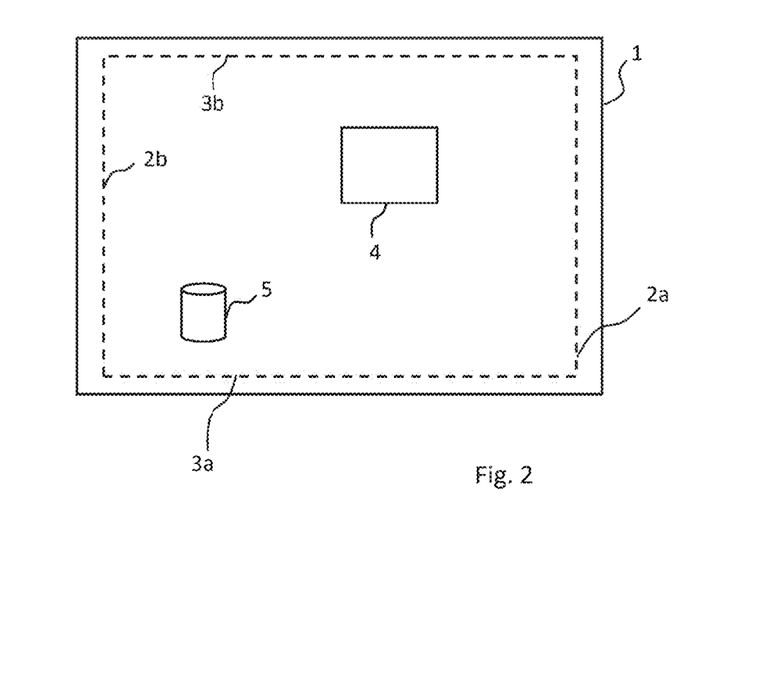
FIG. 2 shows a schematic view of a representation of an output image, where a sensor image is located in a central region of a view image of a three-dimensional scene—and particularly within the edges of the view image, which are defined in addition to the outer edges of the view image.

In the situation illustrated in FIG. 2, and also in all further situations illustrated in FIG. 3 to FIG. 10, the outer edges of the sensor image, use alternatively being able to be made of a two-dimensional image with a sensor representation, extend parallel to the four additionally specified edges of the view image, which extend in a straight line. Although this corresponds to usual situations in the common display of at least two two-dimensional images in each case, the invention is not restricted thereto. Rather, the sensor image 4 illustrated in FIG. 2, for example, could be rotated in relation to the edges of the view image through an angle that is not equal to 90°. Like in the previously mentioned case of convex outer edges of the sensor image or of the representation of the sensor, it is nevertheless possible to unambiguously test whether the sensor image protrudes beyond one of the edges of the view image. Preferably, this is tested in respect of each of the four edges of the view image in a direction perpendicular to the extent of the edge.

In the case of digital two-dimensional images consisting of pixels, the edges of the view image to be used for the test are preferably defined in such a way that they each extend along a row or column of pixels. Would the generation of the output image from a view image and a sensor image yield that the sensor image would lie partly outside of the respectively considered edge, i.e., on its outside, then, as already described above, a different view image would be used instead. In respect of the relative position of the pixels of the sensor image in relation to the edge, this means that, in the case of the non-displaced view image, at least one pixel or a row or column of pixels lies outside of the edge and consequently beyond the edge, as seen from the central region of the view image. In particular, the pixel rows and pixel columns extend parallel to the edges or coincide with an edge, as already explained above. Therefore, if the outermost pixel or the outermost pixel row or pixel column of the sensor image is located outside of the edge, it is offset in relation to the edge by at least one pixel.

The test for this is equivalent to the case where the respective edge is positioned further out by one pixel and a test is carried out as to whether the sensor image extends at least up to the edge from the central region of the view image. This equivalent case falls under the case defined by the patent claims since specifying the relative position or position of an image and testing whether the sensor image or the representation of the sensor would extend beyond the edge also implies a definition or specification of an edge located further out by one pixel, in respect of which a test is carried out as to whether the sensor image reaches the edge. Would this be the case, then the edge located further inside by one pixel would be crossed. Testing whether the edge is crossed would therefore be carried out implicitly by testing whether the edge located further inside has been reached. Here, this equivalence is not restricted to regular pixel grids. Additionally, the edge could be defined such that it does not have the width of a whole pixel.

FIG. 2 shows an outer edge 1. Since the outer edge 1 is the outer edge both of the view image and of the output image in the situation illustrated in FIG. 2 and in further situations illustrated in other figures, but not in all situations, the outer edge of the view image has not been labeled by a separate reference sign in FIG. 2. In the embodiment illustrated in FIG. 2, the four straight line edges 2a, 2b, 3a, 3b of the view image extend parallel to corresponding sections of the outer edge 1, to be precise within the outer edge 1. However, in this case, the distance of the edges 2a, 2b extending in the vertical direction from the adjacent sections of the outer edge 1 is greater than the distance of the edges 3a, 3b extending in the horizontal direction from the parallel sections of the outer edge 1. In other configurations, the distance can always be the same or each edge of the view image used for the test according to the invention can have an individual distance, different from the other edges, from the closest section of the outer edge. To distinguish the various edges, the edges used for the test are represented by a dashed line in FIG. 2 to FIG. 10, whereas the outer edge is represented by means of a peripheral full line. The outer edge of the sensor image 4, too, is represented by a full peripheral line. Further, FIG. 2 shows a part 5 of the scene represented by the view image. Since this part 5 is in any case situated at a fixed position of the three-dimensional scene during an ongoing operating phase with a repeated generation of an output image, the position of the image representation of the part 5 is displaced if a different view image, which represents a different portion of the scene, is chosen. Since the sensor image 4 is located completely within the edges 2, 3 of the view image in the situation illustrated in FIG. 2, the resultant output image offers a clear representation of the sensor image 4 together with the representation of a portion of the scene by the view image.

Figure 3:
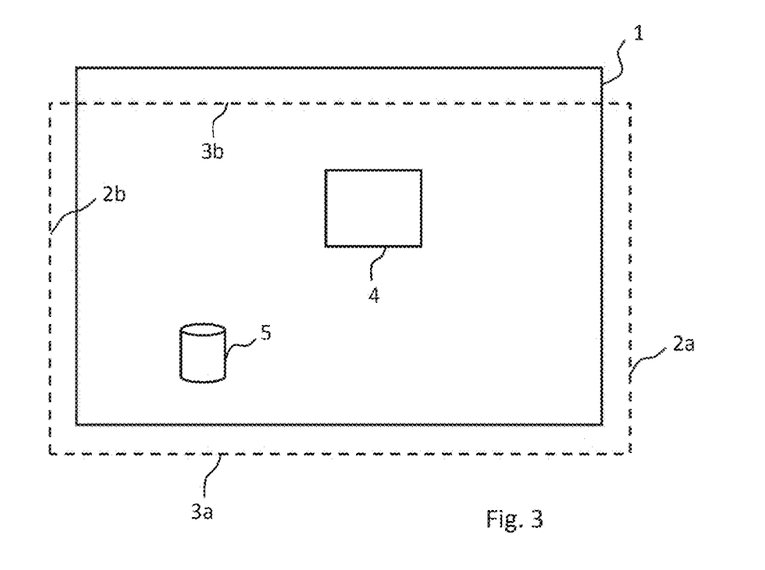
FIG. 3 shows a representation similar to that in FIG. 2 in which the additionally defined edges are positioned differently relative to the outer edges of the view image.

The embodiment shown in FIG. 3 only differs from the embodiment shown in FIG. 2 in that the edges 2a, 2b, 3a, 3b of the view image, which are used for the test according to the invention, extend differently with respect to the outer edge 1 and are positioned differently. As only edge of the four edges, the upper edge 3b extends within the outer edge 1. The other three edges 2a, 2b, 3a extend outside the outer edge 1. Therefore, when the sensor is moved relative to the space in which the workpiece to be captured by the sensor is arrangeable, the sensor image 4 only reaches these three edges if at least one part of the sensor image 4 is located outside of the outer edge 1. Since the outer edge 1 in the example embodiment is also the outer edge of the output image, part of the sensor image 4 would not be displayed.

In the case of the positioning of the edges 2a, 2b, 3a, 3b illustrated in FIG. 3, image content can be displayed directly below the upper section of the outer edge 1, which image content cannot be superposed by the sensor image 4 for as long as the sensor image 4 does not extend beyond both the upper edge 3b and the lower edge 3a or the sensor image 4 is located completely outside of the central region of the view image. Consequently, image information in respect of an interaction of the user, for example, can be displayed in the upper region of the output image, as is the case, for example, for regions of a touch-sensitive screen connected to certain control functions.

Figure 4:
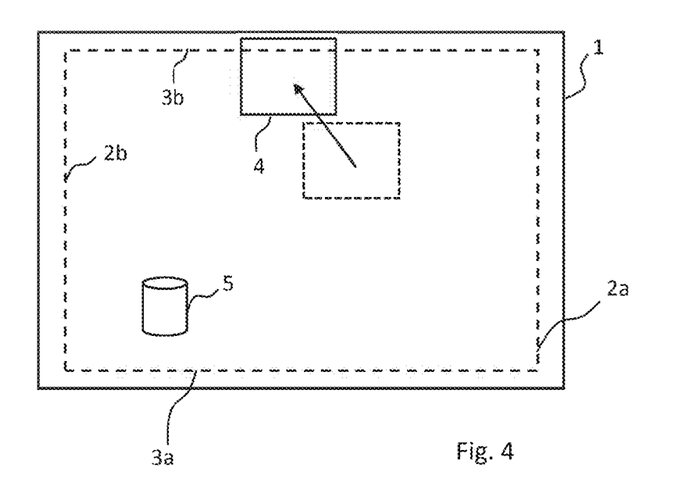
FIG. 4 shows the representation as per FIG. 2 in which the sensor image is displaced in an upward left direction on account of a relative movement with respect to the scene.
Figure 5:
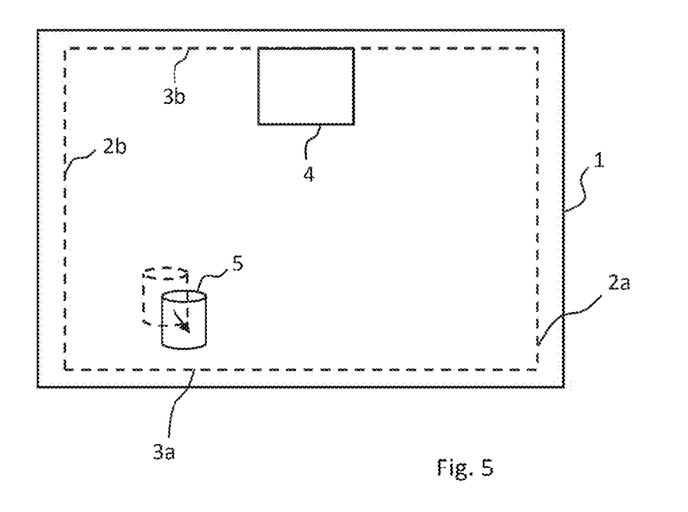
FIG. 5 shows a representation as per FIG. 4 in which a different view image is part of the representation and the portion of the scene represented by the other view image is displaced in such a way that the sensor image is located completely within the central region within the additionally defined edges.

FIG. 4 shows the situation as in FIG. 2, wherein, however, the sensor image 4 has been displaced relative to the scene and consequently relative to the view image, as indicated by an arrow pointing upward and to the left. This is the result of a relative movement of the sensor and the space. The view image of FIG. 4 is the same view image as that of FIG. 2. Consequently, there has been no displacement of the view image and consequently no displacement of the part 5 in relation to the output image. However, the sensor image 4 has crossed the upper edge 3b on account of the displacement. Therefore, the output image of FIG. 4 is not output. Rather, it is established that the sensor image 4 extends beyond the upper edge 3b from the central region of the view image. FIG. 5 is now used to explain that a different view image is therefore generated and used for the output image. Alternatively, the output image of FIG. 4 can be output and it can be established, for example only after the reception of an updated sensor image, that the sensor image extends beyond the edge and a corresponding displacement of the sensor image can occur.

The situation illustrated in FIG. 5 corresponds to a displacement of the sensor image 4 going beyond the situation of FIG. 4 in accordance with the arrow illustrated in FIG. 4, which points upward and to the left. However, as mentioned, a different view image of the scene has been generated, and so in the case of the representation in the correct position of sensor image 4 and view image illustrated in FIG. 5, the sensor image 4 is located within the edges 2a, 2b, 3a, 3b and, in particular, does not extend beyond the upper edge. In this specific example embodiment, the sensor image 4 ends at the upper edge 3b. However, alternatively, a view image could have been produced, which, in the case of a display at the correct position, leads to the sensor image 4 ending at a distance from the upper edge 3b.

Expressed differently, in the situation illustrated in FIG. 5, the scene appears to have been displaced in the direction of the arrow. This displacement has made it possible to display the sensor image 4 completely within the central region of the view image surrounded by the four edges 2a, 2b, 3a, 3b. As an alternative, the displacement can occur not in the direction of the illustrated arrow but in a direction perpendicular to the respective edge beyond which the sensor image extends.

Figure 6:
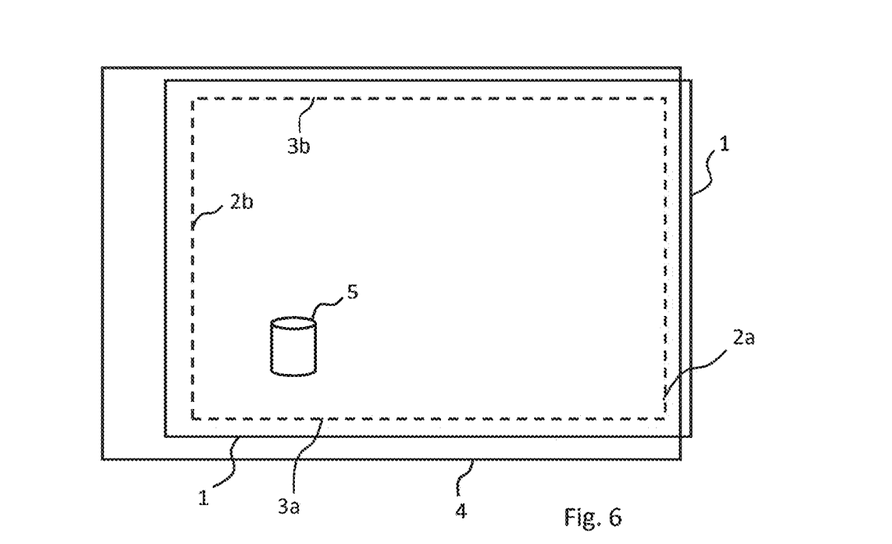
FIG. 6 shows a representation similar to that in FIG. 2 in which the sensor image is larger than the view image and the edges of the sensor image are located completely outside of the additionally defined edges of the view image.

In the situation illustrated in FIG. 6, the sensor image 4 is substantially larger in relation to the view image than in the situations of FIG. 2 to FIG. 5. The sensor image 4 is even so large that it can no longer be displayed completely within the outer edge 1. Like in FIG. 2 to FIG. 5, too, the outer edge 1 in the example embodiment is both the outer edge of the view image and the outer edge of the output image. Therefore, in the specific situation of FIG. 6, only a part of the sensor image 4, albeit a predominant part, is displayed by the output image, wherein, however, a narrow region of the output image in which the sensor image 4 is not located is present at the right section of the outer edge 1. All other regions of the output image coincide with regions of the sensor image 4. By way of example, on account of a representation of contours of the scene shining through, the part 5 of the scene is nevertheless identifiable through the sensor image 4.

Further, the four edges 2a, 2b, 3a, 3b of the view image extend within the outer edge of the sensor image 4. Consequently, there is a situation in which the sensor image 4 extends beyond all of the edges 2a, 2b, 3a, 3b from the central region of the view image. However, this fact on its own does not lead to another view image necessarily being used. Optionally, a different view image could be used such that, for example, the central position in the sensor image 4 (located at the point of intersection of the diagonals of the image) coincides with the central position of the view image and of the output image.

Figure 7:
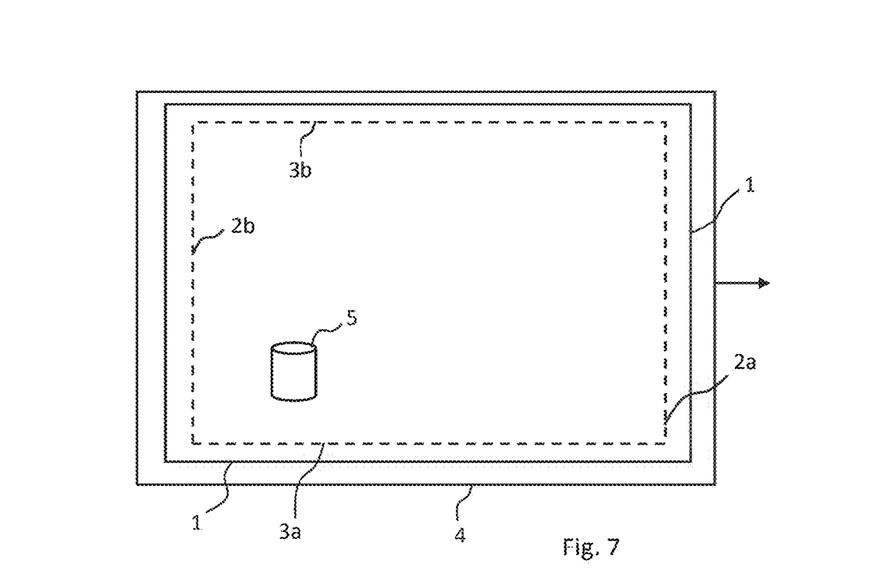
FIG. 7 shows a representation as in FIG. 6 in which the sensor image has been displaced to the right relative to the view image and wherein there has been no displacement of the portion of the scene represented by the view image.

FIG. 7 shows a situation like in FIG. 6, in which the central positions of the sensor image 4 and of the view image or the output image approximately coincide. However, this is not the result of using a different view image in relation to the situation in FIG. 6. Rather, this is the result of a relative movement of the sensor and the space for receiving the workpiece to be captured, as indicated by the arrow pointing to the right, which is illustrated to the right in FIG. 7.

Figure 8:
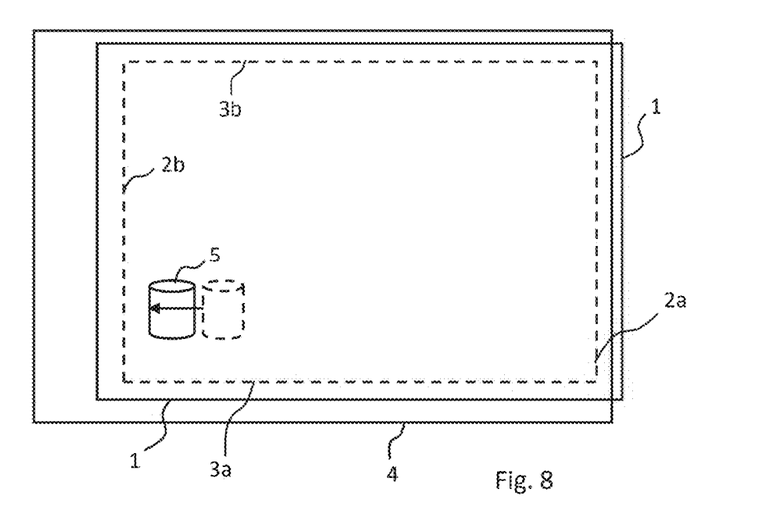
FIG. 8 shows a representation as in FIG. 6 and FIG. 7 in which there has been a displacement of the portion of the scene represented by the view image in the case of the same displacement of the sensor image relative to the view image as in FIG. 7.

According to the embodiment described on the basis of FIG. 6 to FIG. 8, the output image illustrated in FIG. 7 is not generated or not output and, instead, the output image illustrated in FIG. 8 is generated and output. According to the situation illustrated in FIG. 8, the sensor image 4 is still situated at the same relative position as in FIG. 6 with respect to the outer edge 1 and consequently with respect to the view image and the output image. The relative movement of the sensor and of the space for receiving the workpiece, explained on the basis of FIG. 7, has led to another view image being generated, the latter representing a portion of the scene that has been displaced in relation to the situation in FIG. 6. In a manner similar to FIG. 5 for another embodiment, this is identifiable on the basis of a displacement of the part 5 of the scene to the left, in the opposite direction of the displacement of the sensor image 4 in FIG. 7. Therefore, the scene has been displaced to the left in the illustration of FIG. 8. This allows the same part of the sensor image 4 to be used for the output image as in FIG. 6.

Figure 9:
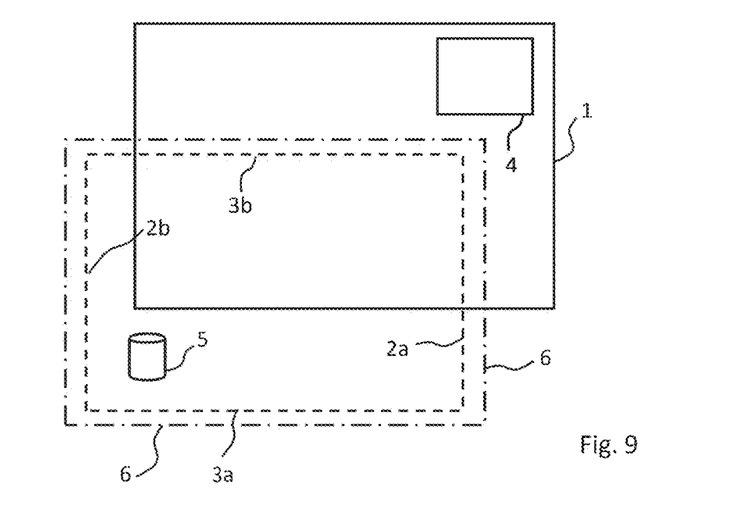
FIG. 9 shows a representation similar to that in FIG. 2 in which the sensor image is located completely outside of the edges additionally defined for the view image and therefore there is no update of the portion of the scene represented by the view image in the case of a relative movement of the sensor and the scene.

FIG. 9 shows a situation in which the outer edge 1 no longer coincides with the outer edge 6 of the view image. In the example embodiment, like in the example embodiments of FIG. 2 to FIG. 8 and like in possible other example embodiments, too, the image area surrounded by the outer edge 1 and the image area surrounded by the outer edge 6 of the view image have the same size. However, such an equal size is not mandatory, even if an at least similar size generally is advantageous since the entire view image or by far the greatest part of the view image can then be displayed by the output image in many situations.

In the situation shown in FIG. 9, the region of the view image showing the part 5 of the scene cannot be displayed in the output image. However, the sensor image 4 is situated completely within the output image, i.e., within the outer edge 1 of the output image. However, since the sensor image 4, on the other hand, is situated completely outside of the central region of the view image surrounded by the four edges 2a, 2b, 3a, 3b, the sensor image 4 does not extend beyond one or more of the edges from the central region and, for this reason, a different view image of the scene is not generated and not used for the output image in any case. A possible reason for the use of a different view image for the output image in the situation illustrated in FIG. 9 could be, for example, that the portion of the scene captured by the view image is magnified or reduced in size. If the portion is magnified and, as preferred, the size of the view image is left unchanged, then the sensor image 4 is reduced in size. However, a corresponding resultant situation is not illustrated in any of the figures.

Figure 10:
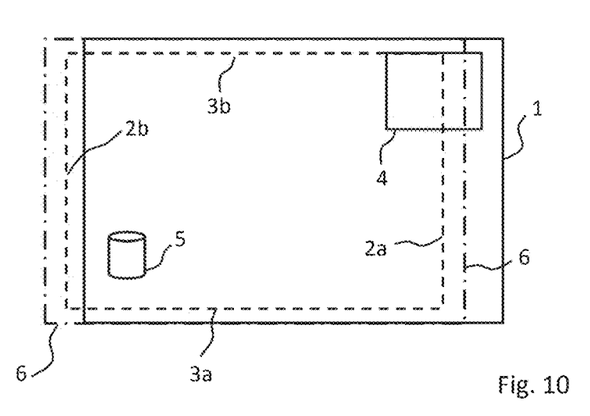
FIG. 10 shows a representation as in FIG. 9 in which there has been a relative movement of the sensor and the scene such that the sensor image is now located between the additionally defined edges of the view image in respect of one of the two linearly independent directions of the sensor image plane.

FIG. 10 illustrates that, in comparison with the situation illustrated in FIG. 9, a displacement of the view image relative to the output image has occurred on account of a relative movement of the sensor and the space for receiving a workpiece. Therefore, the upper and lower sections of the outer edge 6 of the view image and of the outer edge 1 of the output image now are predominantly over one another. However, the left and right sections of the outer edge 6 of the view image and of the outer edge 1 of the output image extend offset from one another such that the view image extends offset to the left in relation to the output image.

In this situation, the upper edge of the sensor image 4 is located at the vertical position of the upper edge 3b for the test as to whether a different view image should be generated and used. Since the sensor image 4 is partly situated within the central region of the view image and, in this case, extends between the lower edge 3a and the upper edge 3b, a test can now be started in respect of the vertical image direction as to whether a different view image is used for the generation of the output image on account of a movement of the sensor relative to the space for receiving the workpiece. Even though this is not illustrated in any of the figures, an upward displacement of the sensor image 4 on account of a corresponding relative movement of the sensor and space would lead to a different view image being generated and used, in which the part 5 of the scene is offset downward in relation to the sensor image 4. As a result, like previously, the sensor image 4 in the output image would not extend beyond the upper edge 3b.

Figure 11:
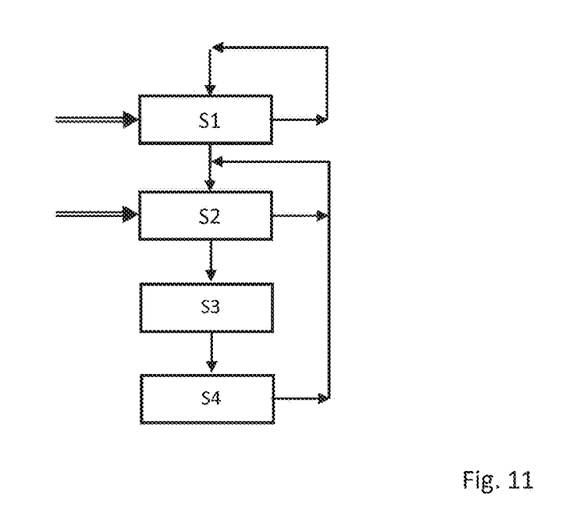
FIG. 11 shows a flowchart for illustrating an example embodiment of a method for visualizing a sensor image or a representation of a sensor together with a view image of a scene.

The flowchart illustrated in FIG. 11 serves to elucidate example embodiments of the method for visualizing sensor signals or a representation of a sensor. In step S1, a check is initially carried out for a current arrangement of the sensor relative to the space for receiving the workpiece to be captured, for a resultant sensor image or for a corresponding representation of the sensor, and for a given view image of the three-dimensional scene as to whether, in the case of a combination in the correct position of the sensor image and of the view image in the output image and in relation to the specified edges of the view image, the sensor image or the representation of the sensor is located completely outside of the central region of the view image, which is surrounded by the specified edges. Should this be the case, step S1 is repeated as soon as the situation has changed.

By contrast, should it be established that the sensor image is situated between opposing edges of the view image at least in respect of one of the two image directions (e.g., vertical direction and horizontal direction), which edges are used for the test according to the invention, then the method is continued with step S2.

In step S2, updated information about the relative position of the sensor in relation to the space for receiving the workpiece to be captured is received. The reception of information is illustrated in FIG. 11, not only in respect of step S2, by way of a double-lined arrow pointing to the right. The relative position of the sensor and/or a change in the relative position of the sensor is obtained, for example, from the position measuring system of the coordinate measuring machine or of the microscope. This position measuring system measures the position or the change in the position of the sensor and/or of a workpiece receptacle.

Should it be established in step S2 that the sensor image extends beyond at least one edge from the central region of the view image on account of the relative movement in respect of a direction to be tested (e.g., vertical direction or horizontal direction), the method is continued with step S3. Otherwise, step S2 is repeated as soon as updated information is available, e.g., information about a relative movement of the sensor or of the space, information about a magnification or reduction in size of the portion of the three-dimensional scene displayed by the view image and/or information about a magnification or reduction in size of the region captured by the sensor. The latter is only relevant if the method serves to visualize the sensor image and not only to visualize a representation of the sensor in relation to a view image.

In step S3, a different view image of the three-dimensional scene is generated, which, in particular, captures a portion of the three-dimensional scene of equal size as the previously valid and current view image and which allows, in the correct position, a display of the sensor image or of the representation of the sensor between the opposing edges.

An appropriate view image is generated therefrom and output in subsequent step S4. Step S4 is followed, once again, by step S2 if there has been a change in the situation.

In a variant of the method, not illustrated, a check can already be carried out in step S2 as well as to whether the sensor image extends beyond both of the opposing edges from the central region of the view image in respect of one of the two directions to be tested. In this case, a check would be carried out in a subsequent step as to whether a relative movement of sensor and space emerges therefrom following the reception of updated information, wherein the sensor image or the representation of the sensor still extends beyond both of the opposing edges from the central region of the view image in respect of the direction to be tested. In this case, another view image is generated in a subsequent step, said other view image corresponding to a displacement of the portion of the scene captured by the view image, in accordance with the relative movement of the sensor. By way of example, this realizes the embodiment described above on the basis of FIG. 6 to FIG. 8. In a subsequent step, the corresponding output image is generated and output. The method is then continued with step S2 again.

It should be observed that the procedure described on the basis of FIG. 11, which corresponds to, e.g., the embodiment described on the basis of FIG. 2, FIG. 4, and FIG. 5, can be carried out in respect of one of the two image directions, wherein, at the same time, the method corresponding, e.g., to the embodiment described on the basis of FIG. 6 to FIG. 8 can be carried out in respect of the other image direction. In this case, a single different view image is generated, which corresponds to the relative movement of the sensor and of the space in both image directions.

The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase at least one of A, B, and C should be construed to mean a logical (A OR B OR C), using a non-exclusive logical OR, and should not be construed to mean "at least one of" A, at least one of B, and at least one of C.

LIST OF REFERENCE SIGNS

1 Outer edge
2, 3 Edges of the view image for the test
4 Sensor image
5 Part of the scene
6 Outer edge of the view image
10 Coordinate measuring machine
12 Workpiece receptacle
16 Upper part
18 Guide rails
20 Lower part
22 Column
24 Slider
26 Optical sensor
28 Tactile sensor
30 Evaluation and control unit
32 Processor

The invention claimed is:

1. A method for visualizing at least one of (i) a sensor of a measurement device and (ii) sensor signals from the sensor, the measurement device having a space for arranging a workpiece and including at least one of a coordinate measuring machine and a microscope, the sensor and the space being movable relative to one another, the method comprising:
    obtaining data relating to a three-dimensional scene that is stationary relative to the space;

based on the data relating to the three-dimensional scene, generating a two-dimensional view image of a portion of the three-dimensional scene, wherein:
the view image has two directions corresponding to its two dimensions;
opposing edges are predefined for the view image with respect to at least one of the two directions; and
a central region of the view image is located between the edges; and repeatedly:
obtaining two-dimensional sensor information, wherein the two-dimensional sensor information comprises one of a sensor image and a representation of the sensor;
combining the two-dimensional sensor information with the view image to form a two-dimensional output image for display by an image display device; and
in response to relative movement between the sensor and the space:
determining whether, when using the same view image as in a previously generated output image, the two-dimensional sensor information of the central region would extend beyond at least one of the two opposing edges; and
in response to extension beyond at least one of the two opposing edges, generating a new two-dimensional view image from the data relating to the three-dimensional scene,
wherein the new view image captures a portion of the three-dimensional scene that has been displaced in accordance with the relative movement.

2. The method of claim 1 further comprising, in response to determining that the two-dimensional sensor information would extend beyond merely one of the two opposing edges from the central region, displacing the portion of the three-dimensional scene such that the two-dimensional sensor information is located between the two opposing edges in the view image.

3. The method of claim 1 further comprising, in response to determining that the two-dimensional sensor information would extend beyond both of the two opposing edges from the central region, displacing the portion of the three-dimensional scene such that the two-dimensional sensor information in the output image, which has an image plane in accordance with the two directions, at least one of:
appears displaced by a distance relative to the three-dimensional scene, which equals the path traveled by the relative movement multiplied by a specified factor; and
appears displaced relative to the three-dimensional scene in the displacement direction, which equals the movement direction of the relative movement projected onto the image plane of the output image.

4. The method of claim 1, wherein:
in respect of the two directions corresponding to the two dimensions of the two-dimensional view image, opposing edges are predefined in each case, resulting in four edges being predefined;
the central region of the view image is located between the four edges; and
the four edges have a closed, peripheral edge profile.

5. The method of claim 1, wherein at least one of the edges is selectively at least partially located outside of the view image.

6. The method of claim 1, wherein at least one of the edges is selectively located within the view image.

7. The method of claim 1, further comprising:
in response to the two-dimensional sensor information of the sensor initially not being situated between opposing edges of the view image with respect to at least one of the two directions of the view image, moving the sensor relative to the space in a direction such that a center of the two-dimensional sensor information and a center of the view image approach one another,
wherein, during the repeated generation of the output image, another two-dimensional view image capturing a portion of the three-dimensional scene that has been displaced in accordance with the relative movement is only generated from the data of the three-dimensional scene in response to the two-dimensional sensor information being at least one of:
located, at least once, completely between the two opposing edges; and
extending, at least once, beyond both opposing edges from the central region.

8. The method of claim 1, wherein the output image displayed on the image display device is used to control the at least one of the coordinate measuring machine and the microscope.

9. The method of claim 1, further comprising:
using a three-dimensional data record related to a three-dimensional coordinate system of the space when generating the output image,
wherein the three-dimensional data record has the three-dimensional data of the scene and data based on a current position of the sensor.

10. The method of claim 1 wherein:
the sensor is an optical sensor; and
the sensor image is generated from image signals of the optical sensor.

11. The method of claim 1 wherein:
the sensor is a tactile sensor.

12. An apparatus for visualizing at least one of (i) a sensor of a measurement device and (ii) sensor signals from the sensor, the measurement device having a space for arranging a workpiece and including at least one of a coordinate measuring machine and a microscope, the sensor and the space being movable relative to one another, the apparatus comprising:
a combining device configured to:
obtain data relating to a three-dimensional scene that is stationary relative to the space;
based on the data relating to the three-dimensional scene, generate a two-dimensional view image of a portion of the three-dimensional scene, wherein:
the view image has two directions corresponding to its two dimensions;
opposing edges are predefined for the view image with respect to at least one of the two directions; and
a central region of the view image is located between the edges; and
repeatedly:
obtain two-dimensional sensor information, wherein the two-dimensional sensor information comprises one of a sensor image and a representation of the sensor;
combine the two-dimensional sensor information with the view image to form a two-dimensional output image for display by an image display device; and
a determining device configured to, in response to relative movement between the sensor and the space:

determine whether, when using the same view image as in a previously generated output image, the two-dimensional sensor information of the central region would extend beyond at least one of the two opposing edges; and in response to extension beyond at least one of the two opposing edges, generate a new two-dimensional view image from the data relating to the three-dimensional scene, wherein the new view image captures a portion of the three-dimensional scene that has been displaced in accordance with the relative movement.

13. The apparatus of claim 12 further comprising, in response to determining that the two-dimensional sensor information would extend beyond merely one of the two opposing edges from the central region, displacing the portion of the three-dimensional scene such that the two-dimensional sensor information is located between the two opposing edges in the view image.

14. The apparatus of claim 12 further comprising, in response to determining that the two-dimensional sensor information would extend beyond both of the two opposing edges from the central region, displacing the portion of the three-dimensional scene such that the two-dimensional sensor information in the output image, which has an image plane in accordance with the two directions, at least one of:

appears displaced by a distance relative to the three-dimensional scene, which equals the path traveled by the relative movement multiplied by a specified factor; and appears displaced relative to the three-dimensional scene in the displacement direction, which equals the movement direction of the relative movement projected onto the image plane of the output image.

15. The apparatus of claim 12 wherein:

in respect of the two directions corresponding to the two dimensions of the two-dimensional view image, opposing edges are predefined in each case, resulting in four edges being predefined;

the central region of the view image is located between the four edges; and the four edges have a closed, peripheral edge profile.

16. The apparatus of claim 12 wherein:

the apparatus is configured to, in response to the two-dimensional sensor information of the sensor initially not being situated between opposing edges of the view image with respect to at least one of the two directions of the view image, move the sensor relative to the space in a direction such that a center of the two-dimensional sensor information and a center of the view image approach one another, during the repeated generation of the output image, another two-dimensional view image capturing a portion of the three-dimensional scene that has been displaced in accordance with the relative movement is only generated from the data of the three-dimensional scene in response to the two-dimensional sensor information being at least one of:

located, at least once, completely between the two opposing edges; and extending, at least once, beyond both opposing edges from the central region.

17. The apparatus of claim 12 wherein the combining device is configured to:

using a three-dimensional data record related to a three-dimensional coordinate system of the space when generating the output image, wherein the three-dimensional data record has the three-dimensional data of the scene and data based on a current position of the sensor.

18. The apparatus of claim 12 further comprising the sensor, wherein:

the sensor is an optical sensor;

the sensor image is generated from image signals of the optical sensor; and the output image displayed on the image display device is used to control the microscope.

19. The apparatus of claim 12 further comprising the sensor, wherein:

the sensor is a tactile sensor; and the output image displayed on the image display device is used to control the coordinate measuring machine.

20. A non-transitory computer-readable medium storing instructions for execution by at least one processor, the instructions comprising:

obtaining data relating to a three-dimensional scene that is stationary relative to a space configured to receive a workpiece;

based on the data relating to the three-dimensional scene, generating a two-dimensional view image of a portion of the three-dimensional scene, wherein:

the view image has two directions corresponding to its two dimensions;

opposing edges are predefined for the view image with respect to at least one of the two directions; and a central region of the view image is located between the edges; and repeatedly:

obtaining two-dimensional sensor information, wherein the two-dimensional sensor information comprises one of a sensor image collected by a sensor and a representation of the sensor, wherein the sensor and the space are movable relative to one another;

combining the two-dimensional sensor information with the view image to form a two-dimensional output image for display by an image display device; and in response to relative movement between the sensor and the space:

determining whether, when using the same view image as in a previously generated output image, the two-dimensional sensor information of the central region would extend beyond at least one of the two opposing edges; and in response to extension beyond at least one of the two opposing edges, generating a new two-dimensional view image from the data relating to the three-dimensional scene, wherein the new view image captures a portion of the three-dimensional scene that has been displaced in accordance with the relative movement.

* * * * *